(12) United States Patent
Liu

(10) Patent No.: US 11,301,515 B2
(45) Date of Patent: Apr. 12, 2022

(54) METHOD AND APPARATUS FOR GENERATING DATA BASED ON QUERY CONTENT

(71) Applicant: Baidu Online Network Technology (Beijing) Co., Ltd., Beijing (CN)

(72) Inventor: Yong Liu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 531 days.

(21) Appl. No.: 15/617,628

(22) Filed: Jun. 8, 2017

(65) Prior Publication Data

US 2018/0173764 A1 Jun. 21, 2018

(30) Foreign Application Priority Data

Dec. 20, 2016 (CN) .......................... 201611188247.6

(51) Int. Cl.
  *G06F 16/903* (2019.01)

(52) U.S. Cl.
  CPC ...... *G06F 16/90335* (2019.01); *G06F 16/903* (2019.01)

(58) Field of Classification Search
  CPC .......................... G06F 16/90335; G06F 16/903
  See application file for complete search history.

(56) References Cited

U.S. PATENT DOCUMENTS

| 6,247,009 | B1 | 6/2001 | Shiiyama |
| 6,917,922 | B1 * | 7/2005 | Bezos .................. G06Q 10/087 705/26.81 |

(Continued)

FOREIGN PATENT DOCUMENTS

| CN | 101169780 A | 4/2008 |
| JP | 2005-229398 A | 8/2005 |
| JP | 2013-228990 A | 11/2013 |

OTHER PUBLICATIONS

Chen, Mi; "Study on SA Hospital Search Engine Marketing Strategy"; Dissertation submitted to Hebei University of Technology, with English abstract; Jun. 2014 (78 pages).

(Continued)

*Primary Examiner* — Tarek Chbouki
*Assistant Examiner* — Maher N Algibhah
(74) *Attorney, Agent, or Firm* — Nixon Peabody LLP

(57) ABSTRACT

The present disclosure proposes a method and an apparatus for generating data based on query content, wherein the method comprises: establishing a first corresponding relationship between the query content and basic information of predetermined data in a database; establishing a second corresponding relationship between a functional attribute of the predetermined data and a destination attribute of the query content; and generating target data according to the first corresponding relationship and the second corresponding relationship. In the present disclosure, corresponding relationships are respectively established according to the query content and the basic information and functional attribute of the predetermined data, and target data are generated according to the corresponding relationships. In this way, data are provided for a user according to the user's requirements at higher accuracy, which not only can enhance efficiency of providing data, but also can increase use experience for the user.

18 Claims, 10 Drawing Sheets

(56) References Cited

U.S. PATENT DOCUMENTS

| | | | |
|---|---|---|---|
| 2009/0070103 A1* | 3/2009 | Beggelman | G06F 40/20 704/9 |
| 2012/0330941 A1* | 12/2012 | Liu | G06Q 30/0625 707/723 |
| 2013/0085781 A1* | 4/2013 | Navani | G06Q 50/22 705/3 |
| 2014/0108460 A1* | 4/2014 | Casella dos Santos | G06F 16/284 707/794 |
| 2015/0356654 A1* | 12/2015 | Katakawa | G06Q 30/0613 705/26.41 |
| 2017/0140118 A1* | 5/2017 | Haddad | G16H 40/63 |

OTHER PUBLICATIONS

Min, Zhu; "Research on natural language question answering for large-scale multi-domains knowledge base"; Master Dissertation to Southwest Jiaotong University; Apr. 24, 2015 (68 pages).

* cited by examiner

METHOD AND APPARATUS FOR GENERATING DATA BASED ON QUERY CONTENT

CROSS-REFERENCE TO RELATED APPLICATION

This application is related to and claims the priority from Chinese Application No. 201611188247.6, filed on Dec. 20, 2016, entitled "Method and Apparatus for Generating Data Based on Query Content," the entire disclosure of which is incorporated herein by reference.

TECHNICAL FIELD

The present disclosure relates to the field of computers, and more particularly, to a method and an apparatus for generating data based on query content.

BACKGROUND

With the development of electronic commerce, data providers increasingly depend on industry data when providing data to clients according to the clients' needs. However, at present, there exists universally a problem that the industries cannot provide standardized industry data, which results in the inability to meet the needs for accuracy of the data provided to the users.

SUMMARY

One of the technical problems to be solved by the present disclosure is that at present all the industries cannot provide standardized industry data, which causes failure of meeting needs by accuracy of the data provided for users.

According to an embodiment of an aspect of the present disclosure, there is provided a method for generating data based on query content, comprising:

establishing a first corresponding relationship between the query content and basic information of predetermined data in a database;

establishing a second corresponding relationship between a functional attribute of the predetermined data and a destination attribute of the query content; and generating target data according to the first corresponding relationship and the second corresponding relationship.

According to an embodiment of another aspect of the present disclosure, there is provided an apparatus for generating data based on query content, comprising:

an apparatus for establishing a first corresponding relationship between the query content and basic information of predetermined data in a database;

an apparatus for establishing a second corresponding relationship between a functional attribute of the predetermined data and a destination attribute of the query content; and an apparatus for generating target data according to the first corresponding relationship and the second corresponding relationship.

In this embodiment, corresponding relationships are respectively established according to the query content and the basic information and functional attribute of the predetermined data, and target data are generated according to the corresponding relationships. In this way, data are provided for a user according to the user's requirements at higher accuracy, which not only can enhance efficiency of providing data, but also can increase use experience for the user.

Those of ordinary skill in the art will realize that although the following detailed description will refer to illustrated embodiments and accompanying drawings, the present disclosure is not limited to these embodiments. Instead, the scope of the present disclosure is extensive, and it is intended that the scope of the present disclosure is limited only by the appended claims.

BRIEF DESCRIPTION OF THE DRAWINGS

By reading the detailed description of non-limiting embodiments with reference to the following accompanying drawings, other features, objectives and advantages of the present disclosure will become more apparent.

The same or similar reference numerals in the accompanying drawings indicate the same or similar components.

DETAILED DESCRIPTION OF EMBODIMENTS

Figure 1:
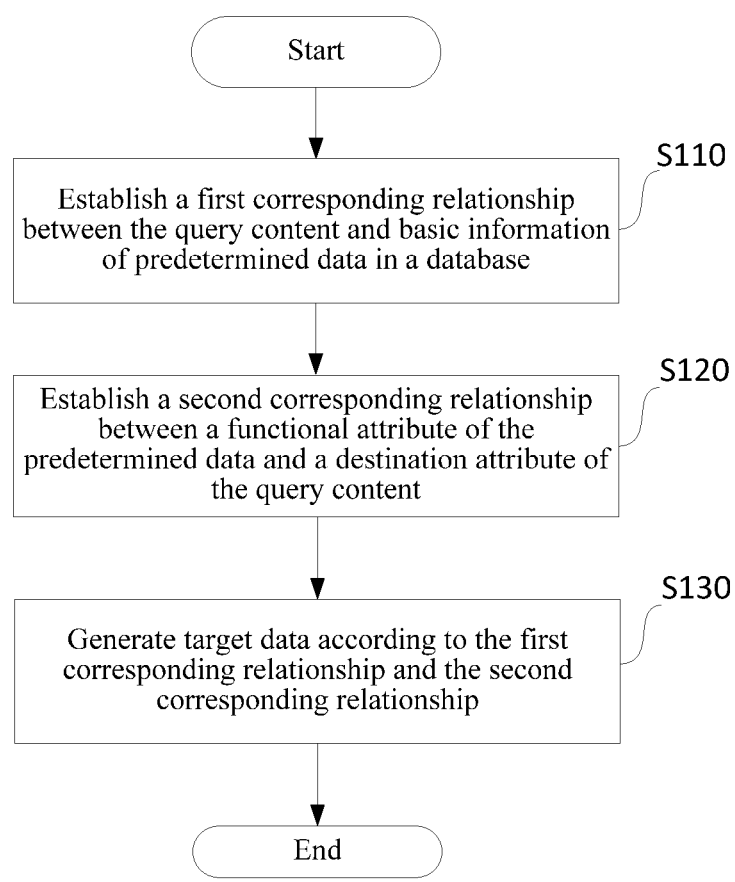
FIG. 1 illustrates a flowchart of a method for generating data based on query content according to the present disclosure.

Before discussing examplary embodiments in more detail, it is to be noted that some examplary embodiments are described as processes or methods depicted as flowcharts. Although in the flowcharts various operations are described as sequential processes, many operations may be implemented concurrently, concomitantly or simultaneously. In addition, the sequences of various operations may be rearranged. When the operations are completed, the processes may be terminated, but the processes may also have additional steps not included in the accompanying drawings. The processes may correspond to methods, functions, procedures, subroutines or subprograms, etc.

Also known as a "computer", the "computer device" mentioned in the context refers to an intelligent electronic device that may perform predetermined processing procedures such as numerical calculation and/or logical calculation by running predetermined programs or instructions. The computer device may comprise a processor and a memory. The predetermined processing procedures may be implemented by executing, by the processor, existent instructions prestored in the memory, or may be implemented by hardware such as ASIC, FPGA and DSP, or may be implemented by combination both. The computer device includes but is not limited to a server, a personal computer, a notebook computer, a tablet computer and a smart mobile phone, etc.

The computer device comprises a user device and a network device. The user device includes but is not limited to a computer, a smart mobile phone, a PDA and the like. The network device comprises but is not limited to a single network server, a server group composed of a plurality of network servers, or a cloud composed of a large number of computers or network servers based on cloud computing, wherein cloud computing is one kind of distributed computing, which is a super virtual computer formed by a cluster of computer sets loosely coupled. The computer device may separately run to implement the present disclosure, or may access networks to implement the present disclosure through interactive operation with other computer devices in the networks. The network where the computer device is located comprises but is not limited to Internet, a Wide Area Network, a Metropolitan Area Network, a Local Area Network, and a VPN network, etc.

It shall be noted that the user device, the network device and the network are merely examples, and other existing or future possibly emerging computer devices or networks, if applicable to the present disclosure, shall also be included within the scope of protection of the present disclosure incorporated herein by reference.

Methods (some of which are shown by means of flowcharts) to be discussed hereinafter may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. One or more processors may perform necessary tasks.

The concrete structures and functional details disclosed herein are merely representative and are for the purpose of describing the exemplary embodiments of the present disclosure. However, the present disclosure maybe specifically implemented by many alternative forms, and should not be interpreted as merely being limited to the embodiments set forth herein.

It is to be understood that, although the terms "first", "second", etc. may be used herein to describe various units, these units should not be limited by these terms. These terms are only used to distinguish one unit from another. For example, a first unit may be termed a second unit, and similarly, a second unit may be termed a first unit, without departing from the scope of example embodiments. As used herein, the term "and/or" includes any and all combinations of one or more of the associated listed items.

It will be understood that when a unit is referred to as being "connected" or "coupled" to another unit, it can be directly connected or coupled to the other unit or intervening units may be present. In contrast, when a unit is referred to as being "directly connected" or "directly coupled" to another unit, there are no intervening units present. Other words used to describe the relationship between units should be interpreted in a similar fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a" and "an" are intended to include the plural forms as well, unless the context clearly indicates otherwise. It will be further understood that the terms "comprises" "comprising" "includes" and/or "including" when used herein, specify the presence of stated features, integers, steps, operations, units and/or components, but do not preclude the presence or addition of one or more other features, integers, steps, operations, units, components and/or combinations thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

The following further describes the present disclosure in detail with reference to the accompanying drawings.

FIG. 1 is a flowchart of a method for generating data based on query content according to an embodiment of the present disclosure.

In combination with FIG. 1, the method for generating data based on query content according to this embodiment comprises following steps:

S110: establishing a first corresponding relationship between the query content and basic information of predetermined data in a database;

S120: establishing a second corresponding relationship between a functional attribute of the predetermined data and a destination attribute of the query content; and S130: generating target data according to the first corresponding relationship and the second corresponding relationship.

These steps are further introduced in detail in the following.

In Step S110, the query content submitted by a user may be acquired first, then a functional attribute included in the query content maybe resolved, and basic information of relevant predetermined data may be determined from a predetermined database according to the functional attribute.

Before establishing the first corresponding relationship, the method may further perform structured processing on the predetermined data, and then determine the basic information of the predetermined data subjected to the structured processing. The basic information of the predetermined data may comprise: a name, an identification, a use attribute, an authorization code and/or component.

Optionally, in the process of establishing the first corresponding relationship, the number of searches and the number of acquisitions of the predetermined data may be added, as parameters, into the first corresponding relationship.

Figure 2:
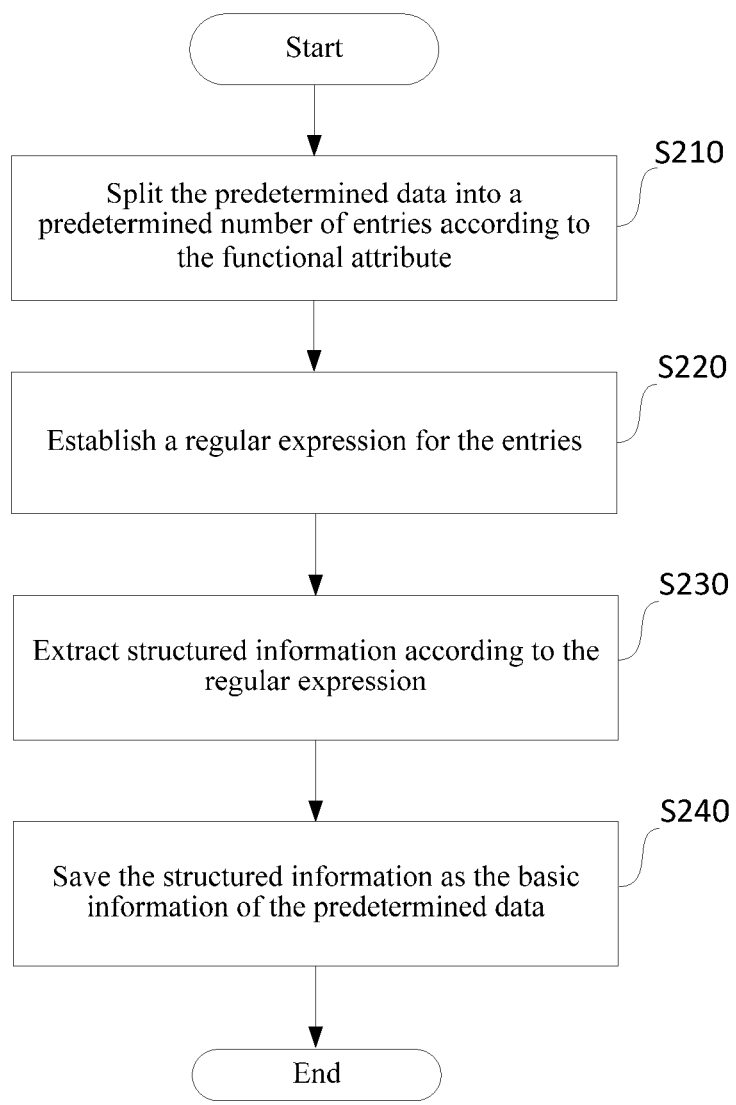
FIG. 2 illustrates a flowchart of determining basic information of the predetermined data according to the present disclosure.

Optionally, in combination with FIG. 2, the determining the basic information of the predetermined data comprises following steps:

Step S210: splitting the predetermined data into a predetermined number of entries according to the functional attribute;

Step S220: establishing a regular expression for the entries;

Step S230: extracting structured information according to the regular expression; and Step S240: saving the structured information as the basic information of the predetermined data.

In Step S120, the destination attribute of the query content may be determined first, and then the second corresponding relationship between the destination attribute of the query content and the functional attribute of the predetermined data may be established according to the functional attribute of the predetermined data.

Optionally, the determining the functional attribute of the predetermined data comprises: capturing by means of a web crawler or extracting from the database, functional attribute information of the predetermined data.

In Step S130, the target data may be generated according to the first corresponding relationship and the second corresponding relationship.

Figure 3:
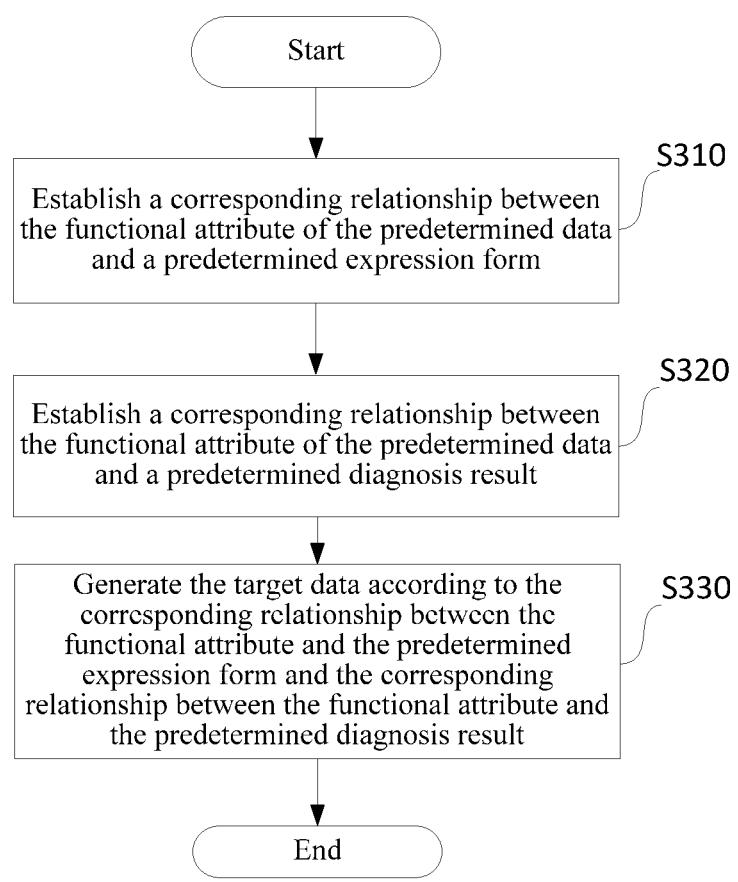
FIG. 3 illustrates a schematic flowchart of the process of generating target data according to the present disclosure.

Optionally, in combination with FIG. 3, the process of generating the target data may comprise following steps:

S310: establishing a corresponding relationship between the functional attribute of the predetermined data and a predetermined expression form;

S320: establishing a corresponding relationship between the functional attribute of the predetermined data and a predetermined diagnosis result; and S330: generating the target data according to the corresponding relationship between the functional attribute and the predetermined expression form and the corresponding relationship between the functional attribute and the predetermined diagnosis result.

The process of establishing a corresponding relationship between the functional attribute of the predetermined data and a predetermined expression form may comprise: determining a corresponding relationship between the identification and the utilization number of the predetermined data and the name of the predetermined expression form.

The establishing a corresponding relationship between the functional attribute of the predetermined data and a predetermined diagnosis result may comprise: determining a corresponding relationship between the identification and the utilization number of the predetermined data and the name of the predetermined diagnosis result.

Adopting the technical solution proposed in this embodiment, corresponding relationships are respectively established according to the query content and the basic information and functional attribute of the predetermined data, and target data are generated according to the corresponding relationships. In this way, data are provided for a user according to the user's requirements at higher accuracy, which not only can enhance efficiency of providing data, but also can increase use experience for the user.

Embodiment I

Figure 4:
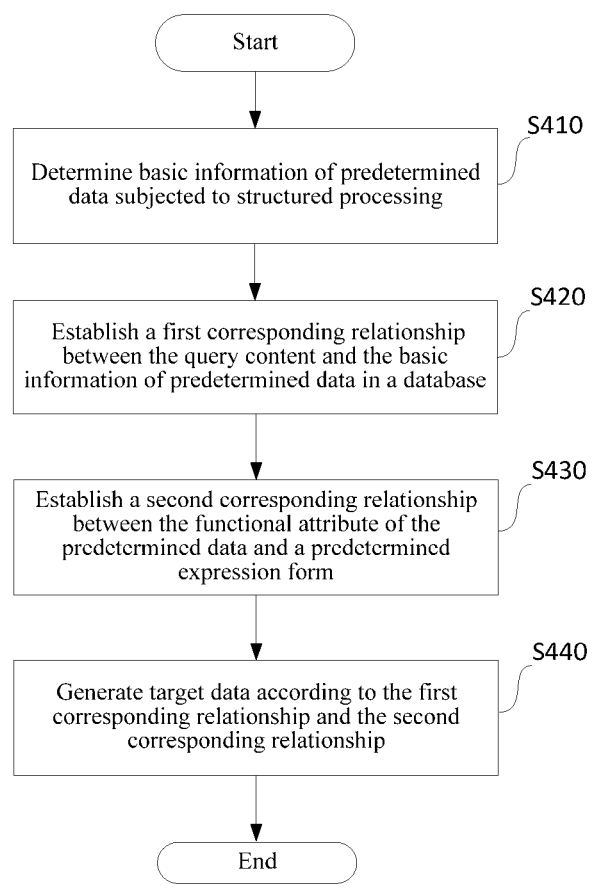
FIG. 4 illustrates a flowchart of a method for generating data based on query content according to the present disclosure.

This embodiment proposes another method for generating data based on query content, in combination with FIG. 4, the method comprises following steps.

S410: determining basic information of predetermined data subjected to structured processing.

The basic information may comprise a name, an identification, a use attribute, an authorization code and/or component, etc.

In this embodiment, a drug instruction is taken as the predetermined data, first structured processing may be performed on the drug instruction, wherein the process of the structured processing may comprise classifying the contents of the drug instruction according to data name, data type and data description.

For example, basic information included in a data name comprises: a drug name, an authorization code, a manufacturer, efficacy, dosage, taboo, a usage method, applicable people and components. A data type corresponding to the data name may include a character string and a numeric value. Data description corresponding to the data name may include the authorization code issued for the drug by a relevant department, dosage and a unit thereof, a type of the applicable people, and drug prescription, etc.

After the structured processing is performed on the drug instruction, information including the data name, data type and data description may be determined as basic information of the drug instruction.

S420: establishing a first corresponding relationship between the query content and the basic information of predetermined data in a database.

Basic information of each drug is generally stored in a drug database, and association between the query content and the basic information of the drug may first be analyzed when the user inputs the query content. The association may comprise whether there exists identical or similar characters, number of times of browsing or purchasing the drug and so on between the query content and the basic information of the drug name. When the query content is identical (for example, cold, inflammation, etc.) or similar (for example, cephalalgia and headache, etc.) to keywords in the basic information of the drug name, the first corresponding relationship between the query content and the basic information of the drug name may be established. The first corresponding relationship may be a one-to-one or one-to-many relationship.

For example, when the query content inputted by the user is to treat the cold, the first corresponding relationship between the query content and a certain cold capsule and cold granules may be established. In addition, the first corresponding relationship may further comprise sorting the drug names, for example, sorting according to the sequence of the numbers of times of browsing or purchasing the drugs.

S430: establishing a second corresponding relationship between the functional attribute of the predetermined data and a predetermined expression form.

Aiming at the drug, when the user cannot make a definite diagnosis of a disease, the destination attribute of a query content may be a manifestation of a certain disease, such as fever, headache, nasal obstruction and the like, and a manifestation of a corresponding disease generally is also included in the efficacy of the drug. Thus, the second corresponding relationship between a drug and symptoms of disease may be established. The functional attribute of the drug may be captured by means of a web crawler or extracted from the database.

For example, when the query content inputted by the user is to treat a fever, the second corresponding relationship between the name of a drug for treating a fever and the fever may be established. In addition, the second corresponding relationship may further comprise a drug identification, description of the symptom, and information quantity of efficaciously curing symptoms using the drug.

S440: generating target data according to the first corresponding relationship and the second corresponding relationship.

The target data generated according to the first corresponding relationship and the second corresponding relationship may comprise: the first corresponding relationship established according to the query content and the basic information of the drug name and the second corresponding relationship established according to the functional attribute of the drug and the symptoms included in the query content.

For example, the target data may comprise contents of three parts: the first part is the basic information of the drug, the second part is the relationship between the query content and the drug, and the third part is the relationship between the drug and the symptoms.

Embodiment II

Figure 5:
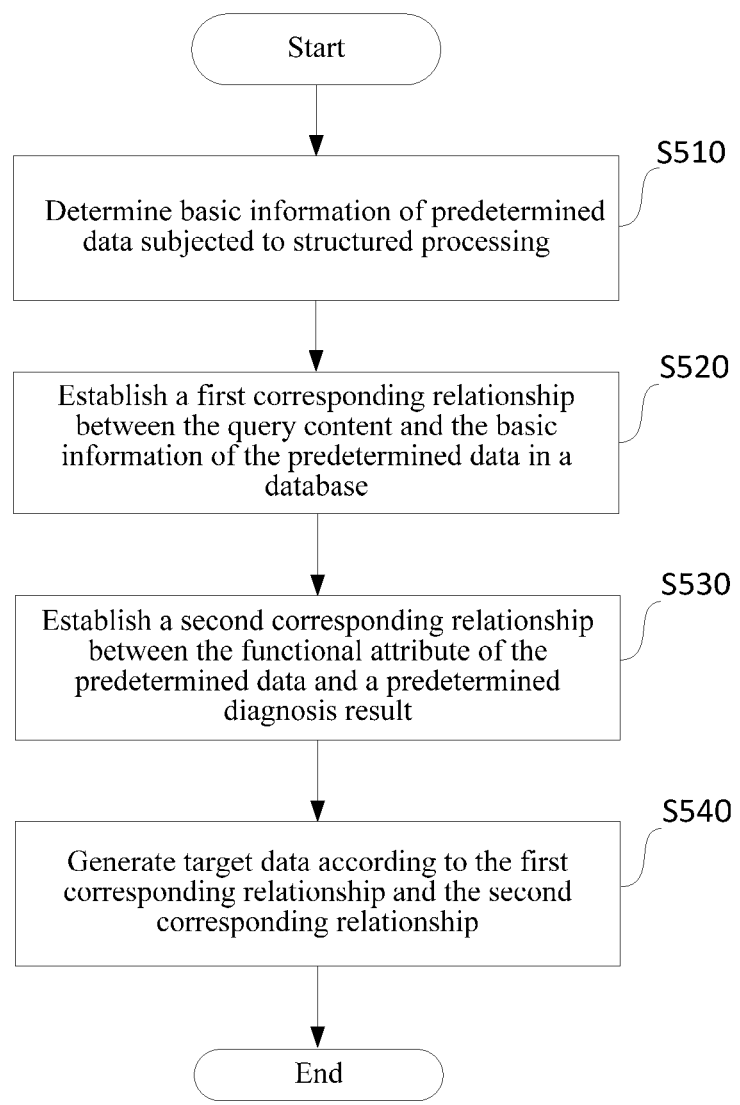
FIG. 5 illustrates a flowchart of another method for generating data based on query content according to the present disclosure.

This embodiment proposes another method for generating data based on query content, in combination with FIG. 5, the method comprises following steps.

S510: determining basic information of predetermined data subjected to structured processing.

The basic information may comprise a name, an identification, a use attribute, an authorization code and/or component, etc.

In this embodiment, a drug instruction is taken as the predetermined data, first structured processing may be performed on the drug instruction, wherein the process of the structured processing may comprise classifying the content of the drug instruction according to data name, data type and data description.

For example, basic information included in a data name comprises: a drug name, an authorization code, a manufacturer, efficacy, dosage, taboo, a usage method, applicable people and components. A data type corresponding to the data name may include a character string and a numeric value. Data description corresponding to the data name may include the authorization code issued for the drug by a relevant department, dosage and a unit thereof, a type of the applicable people, and drug prescription, etc.

After the structured processing is performed on the drug instruction, information including the data name, data type and data description may be determined as basic information of the drug instruction.

S520: establishing a first corresponding relationship between the query content and the basic information of the predetermined data in a database.

Basic information of each drug is generally stored in a drug database, and association between the query content and the basic information of the drug may first be analyzed when the user inputs the query content. The association may comprise whether there exists identical or similar characters, number of times of browsing or purchasing the drug and so on between the query content and the basic information of the drug name. When the query content is identical (for example, cold, inflammation, etc.) or similar (for example, cephalalgia and headache, etc.) to keywords in the basic information of the drug name, the first corresponding relationship between the query content and the basic information of the drug name may be established. The first corresponding relationship may be a one-to-one or one-to-many relationship.

For example, when the query content inputted by the user is to treat the cold, the first corresponding relationship between the query content and a certain cold capsule and cold granules may be established. In addition, the first corresponding relationship may further comprise sorting the drug names, for example, sorting according to the sequence of the numbers of times of browsing or purchasing the drugs.

S530: establishing a second corresponding relationship between the functional attribute of the predetermined data and a predetermined diagnosis result.

Aiming at the drug, when the user has acquired a diagnosis result of a certain disease, the destination attribute of the query content may be the name of the certain disease such as tonsillitis, vascular headache. However, generally the efficacy of the drug also comprises a list of diseases which can be efficaciously treated. Thus, the second corresponding relationship between the name of the drug and the name of the disease may be established. The functional attribute of the drug may be captured by means of a web crawler or extracted from the database.

For example, when the query content inputted by the user is to treat the tonsillitis, the second corresponding relationship between the name of the drug for treating the tonsillitis and the tonsillitis may be established. In addition, the second corresponding relationship may further comprise a drug identification, a disease name, and information quantity of efficaciously curing the disease using the drug.

S540: generating target data according to the first corresponding relationship and the second corresponding relationship.

The target data generated according to the first corresponding relationship and the second corresponding relationship may comprise: the first corresponding relationship established according to the query content and the basic information of the drug name and the second corresponding relationship established according to the functional attribute of the drug and the disease name included in the query content.

For example, the target data may comprise contents of three parts: the first part is the basic information of the drug, the second part is the relationship between the query content and the drug, and the third part is the relationship between the drug and the symptoms.

Figure 6:
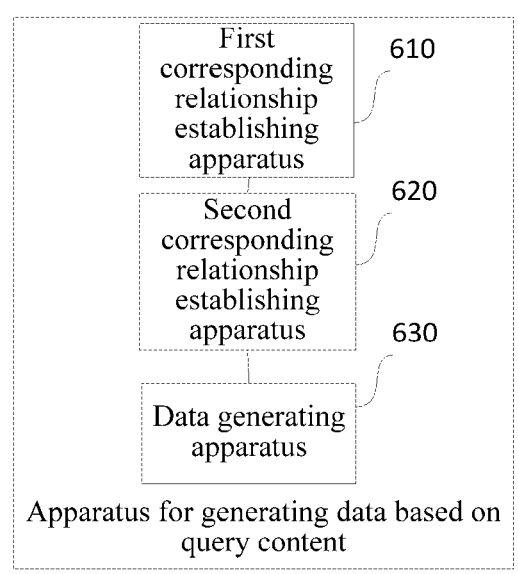
FIG. 6 illustrates a block diagram of an apparatus for generating data based on query content according to the present disclosure.

In combination with FIG. 6, the apparatus for generating data based on query content according to this embodiment comprises following apparatuses:

an apparatus 610 for establishing a first corresponding relationship between the query content and basic information of predetermined data in a database (hereinafter referred to as first corresponding relationship establishing apparatus);

an apparatus 620 for establishing a second corresponding relationship between a functional attribute of the predetermined data and a destination attribute of the query content (hereinafter referred to as second corresponding relationship establishing apparatus); and an apparatus 630 for generating target data according to the first corresponding relationship and the second corresponding relationship (hereinafter referred to as data generating apparatus).

These apparatuses are further introduced in detail in the following.

In this embodiment, the query content submitted by a user may be first acquired by means of the first corresponding relationship establishing apparatus 610, then a functional attribute included in the query content may be resolved, and basic information of relevant predetermined data may be determined from a predetermined database according to the functional attribute.

Before establishing the first corresponding relationship by means of the first corresponding relationship establishing apparatus 610, the apparatus for generating data based on query content according to this embodiment may further perform structured processing on the predetermined data by means of a structured apparatus, and then determine the basic information of the predetermined data subjected to the structured processing. The basic information of the predetermined data may comprise: a name, an identification, a use attribute, an authorization code and/or component.

Optionally, in the process of establishing the first corresponding relationship by means of the first corresponding relationship establishing apparatus 610, the number of searches and the number of acquisitions of the predetermined data may be added, as parameters, into the first corresponding relationship.

Figure 7:
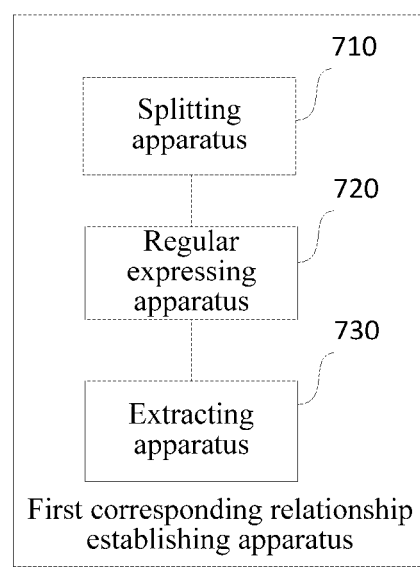
FIG. 7 illustrates a block diagram of an apparatus for establishing a first corresponding relationship according to the present disclosure.

Optionally, in combination with FIG. 7, the first corresponding relationship establishing apparatus 610 comprises:

an apparatus 710 for splitting the predetermined data into a predetermined number of entries according to the functional attribute (hereinafter referred to as splitting apparatus);

an apparatus 720 for establishing a regular expression for the entries (hereinafter referred to as regular expressing apparatus);

an apparatus 730 for extracting structured information according to the regular expression (hereinafter referred to as extracting apparatus); and an apparatus 740 for saving the structured information as the basic information of the predetermined data (hereinafter referred to as information saving apparatus).

After the first corresponding relationship is established by means of the first corresponding relationship establishing apparatus 610, the second corresponding relationship establishing apparatus 620 may determine the destination attribute of the query content, and then establish the second corresponding relationship between the destination attribute of the query content and the functional attribute of the predetermined data according to the functional attribute of the predetermined data.

Optionally, the determining the functional attribute of the predetermined data by means of the second corresponding relationship establishing apparatus 620 comprises: capturing by means of a web crawler or extracting from the database, functional attribute information of the predetermined data.

After the first corresponding relationship is established by means of the second corresponding relationship establishing apparatus 620, the data generating apparatus 630 may generate the target data according to the first corresponding relationship and the second corresponding relationship.

Figure 8:
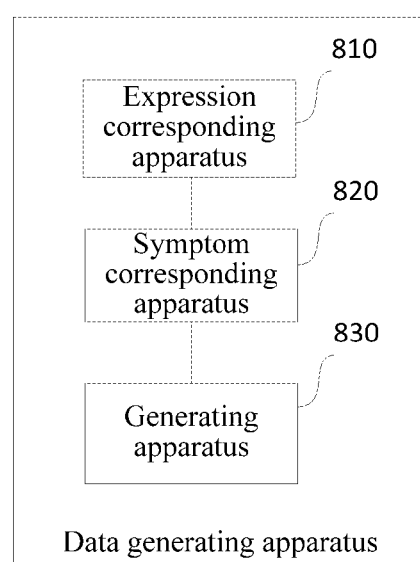
FIG. 8 illustrates a block diagram of an apparatus for generating data according to the present disclosure.

Optionally, in combination with FIG. 8, the data generating apparatus 630 comprises:

an apparatus 810 for establishing a corresponding relationship between the functional attribute of the predetermined data and a predetermined expression form (hereinafter referred to as expression corresponding apparatus);

an apparatus 820 for establishing a corresponding relationship between the functional attribute of the predetermined data and a predetermined diagnosis result (hereinafter referred to as symptom corresponding apparatus); and an apparatus 830 for generating the target data according to the corresponding relationship between the functional attribute and the predetermined expression form and the corresponding relationship between the functional attribute and the predetermined diagnosis result (hereinafter referred to as generating apparatus).

The process of establishing a corresponding relationship between the functional attribute of the predetermined data and a predetermined expression form by means of the expression corresponding apparatus 810 may be implemented by means of an apparatus for determining a corresponding relationship between an identification and a utilization number of the predetermined data and a name of the predetermined expression form.

The process of establishing a corresponding relationship between the functional attribute of the predetermined data and a predetermined diagnosis result by means of the symptom corresponding apparatus 820 may be implemented by means of an apparatus for determining a corresponding relationship between an identification and a utilization number of the predetermined data and a name of the predetermined diagnosis result.

Adopting the technical solution proposed in this embodiment, corresponding relationships are respectively established according to the query content and the basic information and functional attribute of the predetermined data, and target data are generated according to the corresponding relationships. In this way, data are provided for a user according to the user's requirements at higher accuracy, which not only can enhance efficiency of providing data, but also can increase use experience for the user.

Embodiment III

Figure 9:
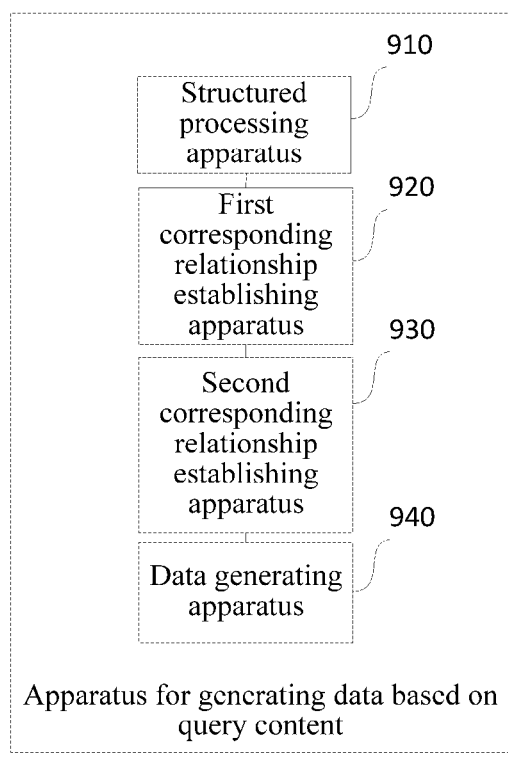
FIG. 9 illustrates a block diagram of another apparatus for generating data based on query content according to Embodiment III of the present disclosure.

This embodiment proposes still another apparatus for generating data based on query content, in combination with FIG. 9, the apparatus comprises following apparatuses:

an apparatus 910 for determining basic information of predetermined data subjected to the structured processing (hereinafter referred to as structured processing apparatus);

an apparatus 920 for establishing a first corresponding relationship between the query content and the basic information of the predetermined data in a database (hereinafter referred to as first corresponding relationship establishing apparatus);

an apparatus 930 for establishing a second corresponding relationship between the functional attribute of the predetermined data and a predetermined expression form (hereinafter referred to as second corresponding relationship establishing apparatus); and an apparatus 940 for generating target data according to the first corresponding relationship and the second corresponding relationship (hereinafter referred to as data generating apparatus).

In this embodiment, a drug instruction is taken as the predetermined data, the basic information may comprise a name, an identification, a use attribute, an authorization code and/or component, etc. First, the structured processing apparatus 910 may perform structured processing on the drug instruction, wherein the process of the structured processing may comprise classifying the contents of the drug instruction according to data name, data type and data description.

For example, basic information included in a data name comprises: a drug name, an authorization code, a manufacturer, efficacy, dosage, taboo, a usage method, applicable people and components. A data type corresponding to the data name may include a character string and a numeric value. Data description corresponding to the data name may include the authorization code issued for the drug by a relevant department, dosage and a unit thereof, a type of the applicable people, and drug prescription, etc.

After the structured processing apparatus 910 performs structured processing on the drug instruction, information including the data name, data type and data description may be determined as basic information of the drug instruction.

Basic information of each drug is generally stored in a drug database, and association between the query content and the basic information of the drug may first be analyzed by means of the first corresponding relationship establishing apparatus 920 when the user inputs the query content. The association may comprise whether there exists identical or similar characters, number of times of browsing or purchasing the drug and so on between the query content and the basic information of the drug name. When the query content is identical (for example, cold, inflammation, etc.) or similar (for example, cephalalgia and headache, etc.) to keywords in the basic information of the drug name, the first corresponding relationship between the query content and the basic information of the drug name may be established by means of the first corresponding relationship establishing apparatus 920. The first corresponding relationship may be a one-to-one or one-to-many relationship.

For example, when the query content inputted by the user is to treat the cold, the first corresponding relationship between the query content and a certain cold capsule and cold granules maybe established by means of the first corresponding relationship establishing apparatus 920. In addition, the first corresponding relationship may further comprise sorting the drug names, for example, sorting according to the sequence of the numbers of times of browsing or purchasing the drugs.

Aiming at the drug, when the user cannot make a definite diagnosis of a disease, the destination attribute of a query content may be a manifestation of a certain disease, such as fever, headache, nasal obstruction and the like, and a manifestation of a corresponding disease generally is also included in the efficacy of the drug. Thus, the second corresponding relationship between a drug and symptoms of disease maybe established by means of the second corresponding relationship establishing apparatus 930. The functional attribute of the drug may be captured by means of a web crawler or extracted from the database.

For example, when the query content inputted by the user is to treat a fever, the second corresponding relationship between the name of a drug for treating a fever and the fever may be established by means of the second corresponding relationship establishing apparatus 930. In addition, the second corresponding relationship may further comprise a drug identification, description of the symptom, and information quantity of efficaciously curing symptoms using the drug.

The target data generated by the data generating apparatus 940 according to the first corresponding relationship and the second corresponding relationship may comprise: the first corresponding relationship established according to the query content and the basic information of the drug name and the second corresponding relationship established according to the functional attribute of the drug and the symptoms included in the query content.

For example, the target data may comprise contents of three parts: the first part is the basic information of the drug, the second part is the relationship between the query content and the drug, and the third part is the relationship between the drug and the symptoms.

Embodiment IV

Figure 10:
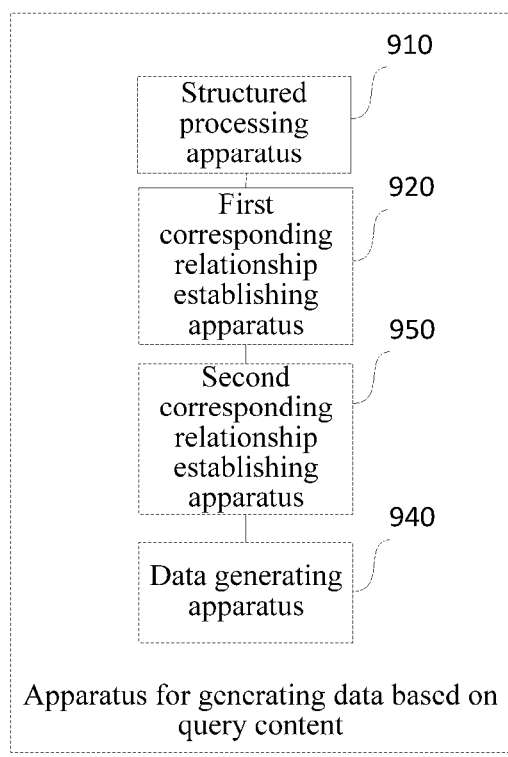
FIG. 10 illustrates a block diagram of another apparatus for generating data based on query content according to Embodiment IV of the present disclosure.

This embodiment proposes still another apparatus for generating data based on query content, in combination with FIG. 10, the apparatus comprises following apparatuses:

an apparatus 910 for determining basic information of predetermined data subjected to the structured processing (hereinafter referred to as structured processing apparatus);

an apparatus 920 for establishing a first corresponding relationship between the query content and the basic information of the predetermined data in a database (hereinafter referred to as first corresponding relationship establishing apparatus);

an apparatus 950 for establishing a second corresponding relationship between the functional attribute of the predetermined data and a predetermined expression form (hereinafter referred to as second corresponding relationship establishing apparatus); and an apparatus 940 for generating target data according to the first corresponding relationship and the second corresponding relationship (hereinafter referred to as data generating apparatus).

In this embodiment, a drug instruction is taken as the predetermined data, the basic information may comprise a name, an identification, a use attribute, an authorization code and/or component, etc. First, the structured processing apparatus 910 may perform structured processing on the drug instruction, wherein the process of the structured processing may comprise classifying the contents of the drug instruction according to data name, data type and data description.

For example, basic information included in a data name comprises: a drug name, an authorization code, a manufacturer, efficacy, dosage, taboo, a usage method, applicable people and components. A data type corresponding to the data name may include a character string and a numeric value. Data description corresponding to the data name may include the authorization code issued for the drug by a relevant department, dosage and a unit thereof, a type of the applicable people, and drug prescription, etc.

After the structured processing apparatus 910 performs structured processing on the drug instruction, information including the data name, data type and data description may be determined as basic information of the drug instruction.

Basic information of each drug is generally stored in a drug database, and association between the query content and the basic information of the drug may first be analyzed by means of the first corresponding relationship establishing apparatus 920 when the user inputs the query content. The association may comprise whether there exists identical or similar characters, number of times of browsing or purchasing the drug and so on between the query content and the basic information of the drug name. When the query content is identical (for example, cold, inflammation, etc.) or similar (for example, cephalalgia and headache, etc.) to keywords in the basic information of the drug name, the first corresponding relationship between the query content and the basic information of the drug name may be established by means of the first corresponding relationship establishing apparatus 920. The first corresponding relationship may be a one-to-one or one-to-many relationship.

For example, when the query content inputted by the user is to treat the cold, the first corresponding relationship between the query content and a certain cold capsule and cold granules maybe established by means of the first corresponding relationship establishing apparatus 920. In addition, the first corresponding relationship may further comprise sorting the drug names, for example, sorting according to the sequence of the numbers of times of browsing or purchasing the drugs.

Aiming at the drug, when the user has acquired a diagnosis result of a certain disease, the destination attribute of the query content may be the name of the certain disease such as tonsillitis, vascular headache. However, generally the efficacy of the drug also comprises a list of diseases which can be efficaciously treated. Thus, the second corresponding relationship between a drug and symptoms of disease maybe established by means of the second corresponding relationship establishing apparatus 950. The functional attribute of the drug may be captured by means of a web crawler or extracted from the database.

For example, when the query content inputted by the user is to treat the tonsillitis, the second corresponding relationship between the name of the drug for treating the tonsillitis and the tonsillitis may be established by means of the second corresponding relationship establishing apparatus 950. In addition, the second corresponding relationship may further comprise a drug identification, a disease name, and information quantity of efficaciously curing the disease using the drug.

The target data generated by the data generating apparatus 940 according to the first corresponding relationship and the second corresponding relationship may comprise: the first corresponding relationship established according to the query content and the basic information of the drug name and the second corresponding relationship established according to the functional attribute of the drug and the symptoms included in the query content.

For example, the target data may comprise contents of three parts: the first part is the basic information of the drug, the second part is the relationship between the query content and the drug, and the third part is the relationship between the drug and the symptoms.

It shall be noted that, the present disclosure may be implemented in software and/or a combination of software and hardware, for example, each apparatus in the present disclosure may be implemented using an application-specific integrated circuit (ASIC) or any other similar hardware device. In an embodiment, the software programs of the present disclosure may be executed by a processor to implement the above steps or functions. Similarly, the software programs of the present disclosure (comprising relevant data structures) may be stored in a computer-readable recording medium, for example, a RAM, a magnetic or optical driver, a floppy disk, or a similar device. Furthermore, some steps or functions of the present disclosure may be implemented using hardware, for example, a circuit cooperating with a processor so as to execute each step or function.

For those skilled in the art, it is apparent that the present disclosure is not limited to the details of the above exemplary embodiments, and the present disclosure can be implemented by way of other embodiments without departing from the spirit or basic features of the present disclosure. Therefore, in any way, the embodiments shall be regarded as exemplary rather than limiting; the scope of the present disclosure is limited by the appended claims, instead of the above description. Thus, all variations which fall into the meaning and scope of equivalent units of the claims shall be covered within the present disclosure. No reference numerals in the claims shall be regarded as limiting the involved claims. Besides, it is apparent that the term "comprise" does not exclude other units or steps, and singularity does not exclude plurality. A plurality of units or apparatuses set forth in a system claim may also be implemented by a single unit or apparatus through software or hardware. Terms such as first and second are used to indicate names, but do not indicate any particular sequence.

Although the exemplary embodiments are particularly shown and described previously, those skilled in the art will appreciate that the embodiments may be varied in form and detail aspects without departing from the spirit and scope of the claims. The protection sought herein is set forth in the appended claims.

What is claimed is:

1. A method for generating data based on query content, comprising:
   resolving a functional attribute of the query content, and establishing a first corresponding relationship between the functional attribute of the query content and basic information of predetermined data in a database;
   determining a destination attribute of the query content, and establishing a second corresponding relationship between a functional attribute of the predetermined data in the database and the destination attribute of the query content, the destination attribute of the query content being a predetermined manifestation or a predetermined diagnosis result; and
   generating target data according to the first corresponding relationship between the functional attribute of the query content and basic information of predetermined data in a database and the second corresponding relationship between the functional attribute of the predetermined data in the database and the destination attribute of the query content, the target data comprising the first corresponding relationship between the functional attribute of the query content and basic information of predetermined data in a database, the second corresponding relationship between the functional attribute of the predetermined data in the database and the destination attribute of the query content, and the basic information of predetermined data;
   wherein establishing the first corresponding relationship between the functional attribute of the query content and basic information of predetermined data in the database comprises:
   adding the number of searches of the predetermined data and the number of acquisitions of the predetermined data, as parameters, to the first corresponding relationship between the functional attribute of the query content and basic information of predetermined data in the database.

2. The method according to claim 1, further comprising:
   performing structured processing on the predetermined data; and
   determining the basic information of the predetermined data subjected to the structured processing.

3. The method according to claim 2, wherein the determining the basic information of the predetermined data comprises:
   splitting the predetermined data into a predetermined number of entries according to the functional attribute;
   establishing a regular expression for the entries;
   extracting structured information according to the regular expression; and
   saving the structured information as the basic information of the predetermined data.

4. The method according to claim 3, wherein the basic information of the predetermined data comprises: a name, an identification, a use attribute, an authorization code and/or component.

5. The method according to claim 1, wherein the determining the functional attribute of the predetermined data comprises:
   capturing by means of a web crawler or extracting from the database, functional attribute information of the predetermined data.

6. The method according to claim 1, wherein the generating target data according to the first corresponding relationship and the second corresponding relationship comprises:
   establishing a corresponding relationship between the functional attribute of the predetermined data and the predetermined manifestation;
   establishing a corresponding relationship between the functional attribute of the predetermined data and the predetermined diagnosis result; and
   generating the target data according to the corresponding relationship between the functional attribute and the predetermined manifestation, and the corresponding relationship between the functional attribute and the predetermined diagnosis result.

7. The method according to claim 6, wherein the determining the corresponding relationship between the functional attribute of the predetermined data and the predetermined manifestation comprises:
determining a corresponding relationship between an identification and a utilization number of the predetermined data and a name of the predetermined manifestation.

8. The method according to claim 6, wherein the establishing a corresponding relationship between the functional attribute of the predetermined data and a predetermined diagnosis result comprises:
determining a corresponding relationship between an identification and a utilization number of the predetermined data and a name of the predetermined diagnosis result.

9. An apparatus for generating data based on query content, comprising:
at least one processor; and
a memory storing instructions, which when executed by the at least one processor, cause the at least one processor to perform operations, the operations comprising:
resolving a functional attribute of the query content, and establishing a first corresponding relationship between the functional attribute of the query content and basic information of predetermined data in a database;
determining a destination attribute of the query content, and establishing a second corresponding relationship between a functional attribute of the predetermined data in the database and the destination attribute of the query content, the destination attribute of the query content being a predetermined manifestation or a predetermined diagnosis result; and
generating target data according to the first corresponding relationship between the functional attribute of the query content and basic information of predetermined data in a database and the second corresponding relationship between the functional attribute of the predetermined data in the database and the destination attribute of the query content, the target data comprising the first corresponding relationship between the functional attribute of the query content and basic information of predetermined data in a database, the second corresponding relationship between the functional attribute of the predetermined data in the database and the destination attribute of the query content, and the basic information of predetermined data;
wherein establishing the first corresponding relationship between the functional attribute of the query content and basic information of predetermined data in the database comprises:
adding the number of searches of the predetermined data and the number of acquisitions of the predetermined data, as parameters, to the first corresponding relationship between the functional attribute of the query content and basic information of predetermined data in the database.

10. The apparatus according to claim 9, the operations further comprising:
performing structured processing on the predetermined data; and
determining the basic information of the predetermined data subjected to the structured processing.

11. The apparatus according to claim 10, wherein the determining the basic information of the predetermined data subjected to the structured processing comprises:
splitting the predetermined data into a predetermined number of entries according to the functional attribute;
establishing a regular expression for the entries;
extracting structured information according to the regular expression; and
saving the structured information as the basic information of the predetermined data.

12. The apparatus according to claim 11, wherein the basic information of the predetermined data comprises: a name, an identification, a use attribute, an authorization code and/or component.

13. The apparatus according to claim 9, wherein the establishing a second corresponding relationship between a destination attribute of the query content and a functional attribute of the predetermined data comprises:
capturing by means of a web crawler or extracting from the database, functional attribute information of the predetermined data.

14. The apparatus according to claim 9, wherein the generating target data according to the first corresponding relationship and the second corresponding relationship comprises:
establishing a corresponding relationship between the functional attribute of the predetermined data and the predetermined manifestation;
establishing a corresponding relationship between the functional attribute of the predetermined data and the predetermined diagnosis result; and
generating the target data according to the corresponding relationship between the functional attribute and the predetermined manifestation and the corresponding relationship between the functional attribute and the predetermined diagnosis result.

15. The apparatus according to claim 14, wherein the determining the corresponding relationship between the functional attribute of the predetermined data and the predetermined manifestation comprises:
determining a corresponding relationship between an identification and a utilization number of the predetermined data and a name of the predetermined manifestation.

16. The apparatus according to claim 14, wherein the establishing a corresponding relationship between the functional attribute of the predetermined data and a predetermined diagnosis result comprises:
determining a corresponding relationship between an identification and a utilization number of the predetermined data and a name of the predetermined diagnosis result.

17. A non-transitory computer storage medium storing a computer program, which when executed by one or more processors, cause the one or more processors to perform operations, the operations comprising:
resolving a functional attribute of the query content, and establishing a first corresponding relationship between the functional attribute of the query content and basic information of predetermined data in a database;
determining a destination attribute of the query content, and establishing a second corresponding relationship between a functional attribute of the predetermined data in the database and the destination attribute of the query content, the destination attribute of the query content being a predetermined manifestation or a predetermined diagnosis result; and
generating target data according to the first corresponding relationship between the functional attribute of the query content and basic information of predetermined data in a database and the second corresponding relationship between the functional attribute of the predetermined data in the database and the destination attribute of the query content, the target data comprising the first corresponding relationship between the functional attribute of the query content and basic information of predetermined data in a database, the second corresponding relationship between the functional attribute of the predetermined data in the database and the destination attribute of the query content, and the basic information of predetermined data;

wherein establishing the first corresponding relationship between the functional attribute of the query content and basic information of predetermined data in the database comprises:

adding the number of searches of the predetermined data and the number of acquisitions of the predetermined data, as parameters, to the first corresponding relationship between the functional attribute of the query content and basic information of predetermined data in the database.

18. The non-transitory computer storage medium according to claim 17, the operations further comprising:

performing structured processing on the predetermined data; and determining the basic information of the predetermined data subjected to the structured processing.

* * * * *